United States Patent [19]
Perkins

[11] 3,987,881
[45] Oct. 26, 1976

[54] SAFETY GUARD
[75] Inventor: Harold W. Perkins, Milwaukee, Wis.
[73] Assignee: Perkins & Mundt Inc., Brookfield, Wis.
[22] Filed: Apr. 17, 1975
[21] Appl. No.: 568,960

[52] U.S. Cl. ............................. 192/133; 192/130; 74/612; 100/53
[51] Int. Cl.² ......................................... F16D 7/00
[58] Field of Search ....... 192/133, 130, 134, 129 A; 74/612, 613; 100/53

[56] References Cited
UNITED STATES PATENTS

| | | | |
|---|---|---|---|
| 1,575,843 | 3/1926 | Jones | 192/134 |
| 2,724,287 | 11/1955 | Knotz | 192/130 |
| 3,641,841 | 2/1972 | Komori | 100/53 |
| 3,815,440 | 6/1974 | Mikvlin | 100/53 |
| 3,848,721 | 11/1974 | Smit | 192/133 |

Primary Examiner—Samuel Scott
Assistant Examiner—Randall Heald
Attorney, Agent, or Firm—Joseph P. House, Jr.

[57] ABSTRACT

A safety guard for a machine tool, such as a punch press, having an operating part, such as a ram, having a control member. The guard comprises gates between the operating part and a machine tool operator. One of the gates is slidable across the front of the machine tool. Another of the gates is disposed at the side of the machine tool and has a pivot on which it is swingable. The sliding gate carries a control actuator and closes on a path which intersects the free end of the swinging gate which has a bumper. The sliding gate is powered by an air cylinder having a control accessible to the operator. When either gate is open, the machine tool control member is deactuated and there is no danger that the machine tool will operate to endanger the operator's hands. The machine tool operator actuates the gate control to close the sliding gate. If there is any obstruction in the path of the gate, such as the operator's hand, the gate will not close, or the gate will push the operator's hand against the bumper on the swinging gate so that swinging gate is opened by this pressure. In either event, the machine tool control member is not actuated. Novel control actuators, latches and control disabling means are provided for the purpose of controlling gate movement and control actuation to insure maximum safety for the operator, to prevent repeated control operation under certain circumstances and to disable the control actuating mechanism when the swinging gate opens.

13 Claims, 20 Drawing Figures

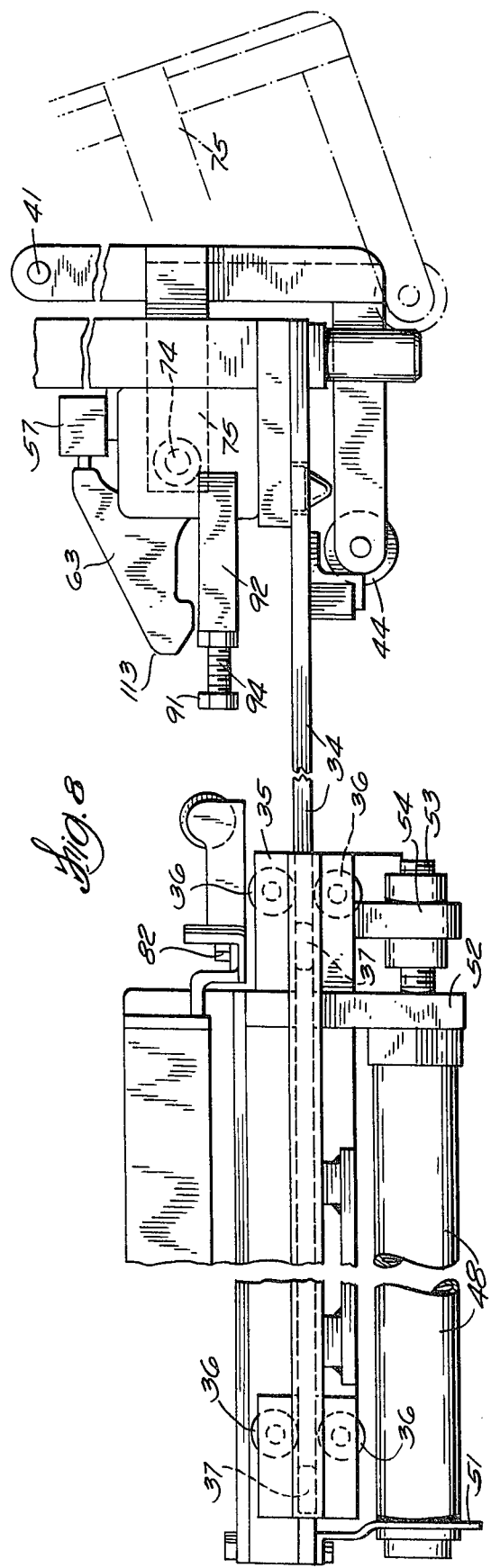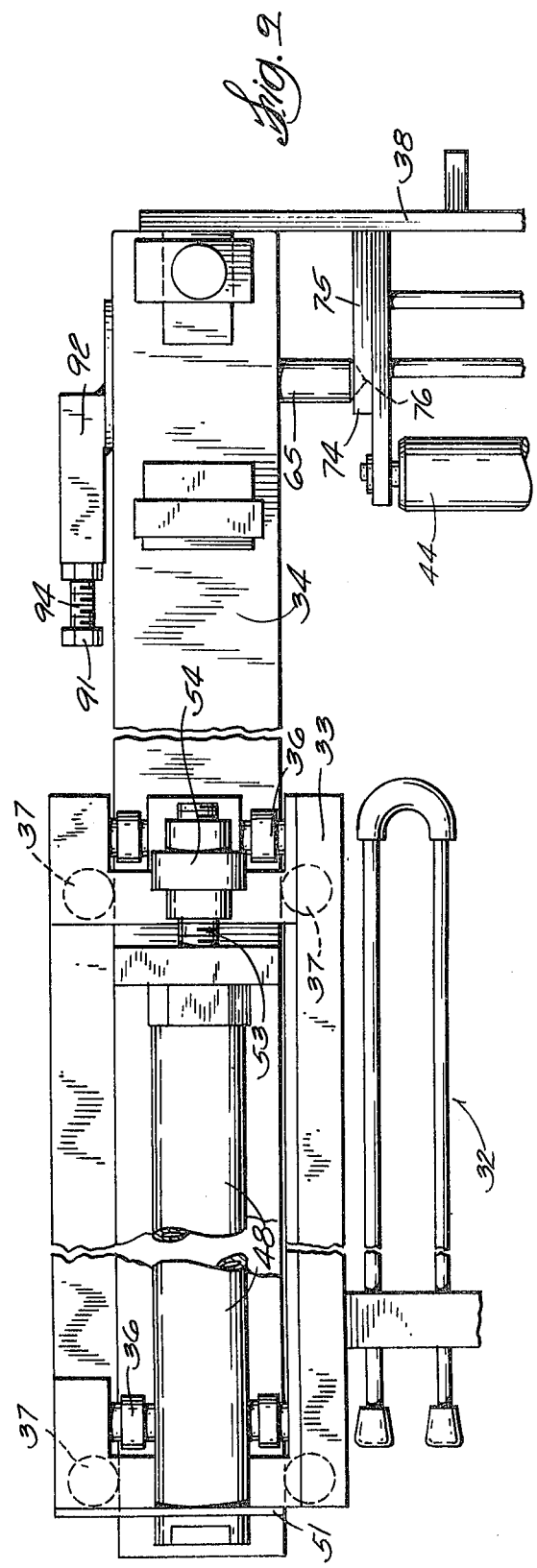

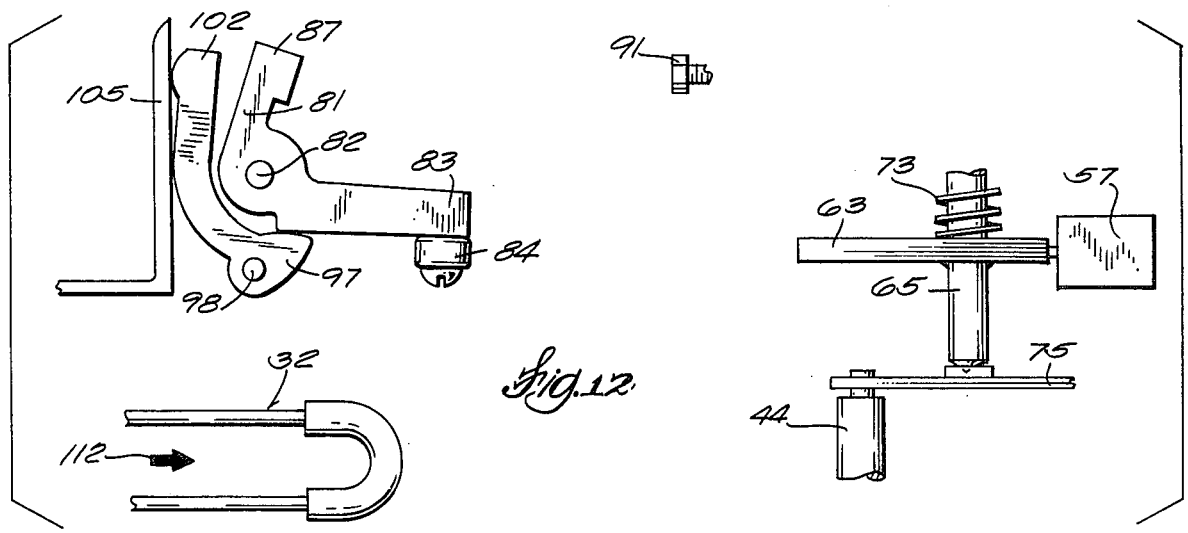
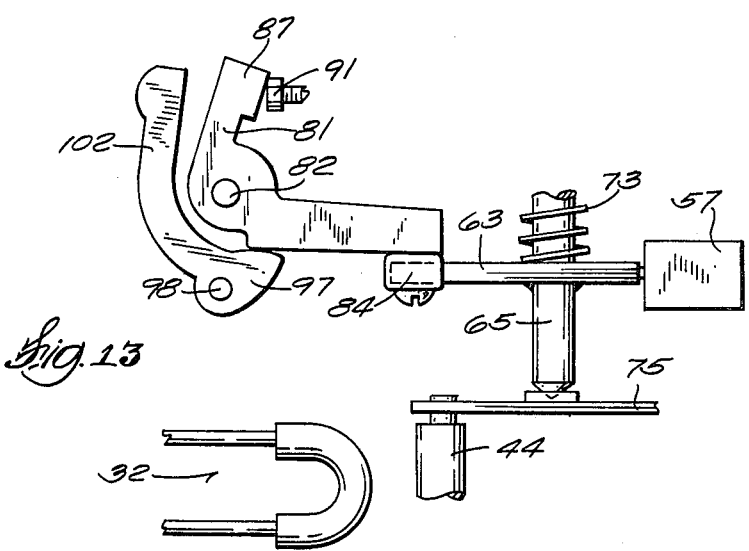
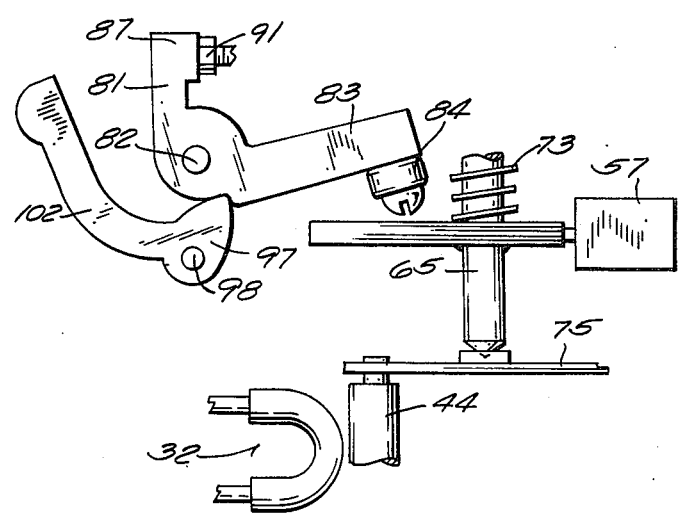

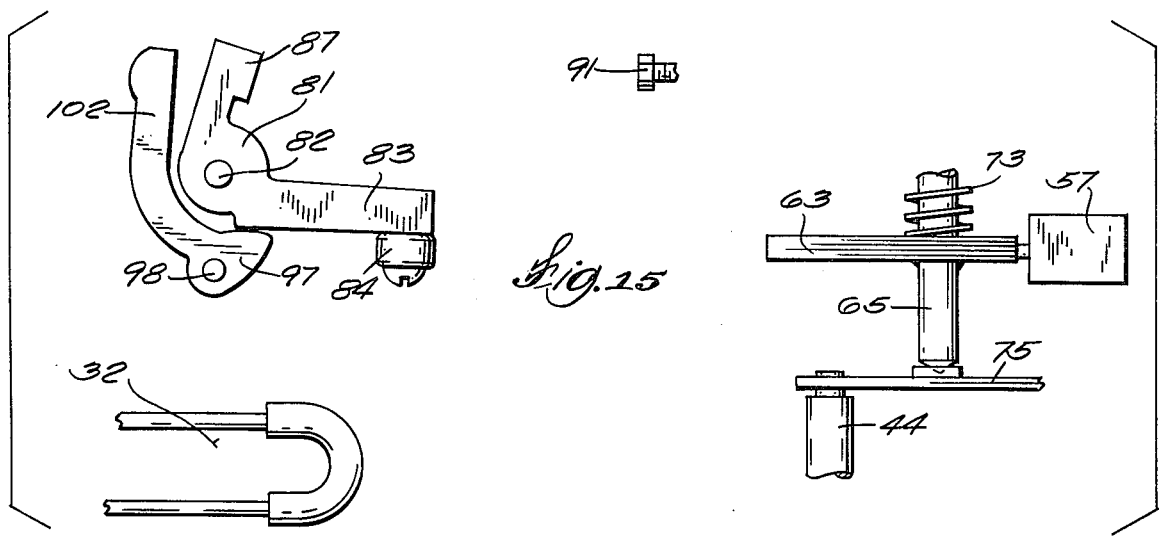
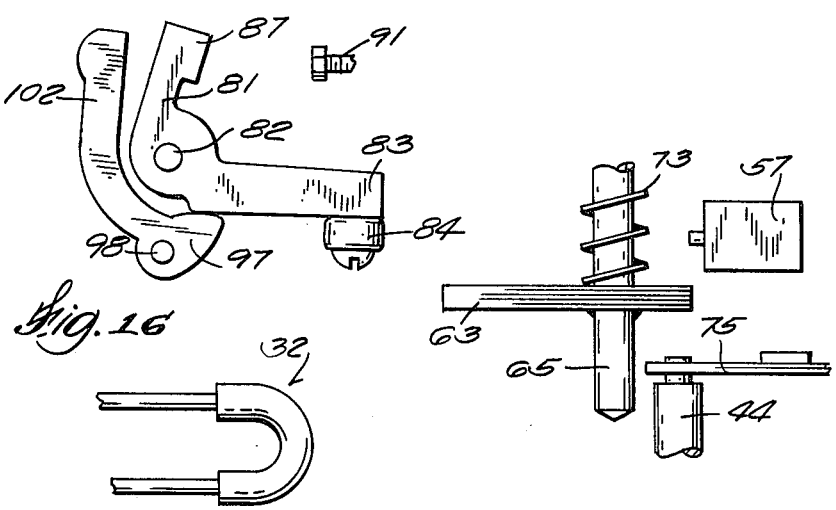
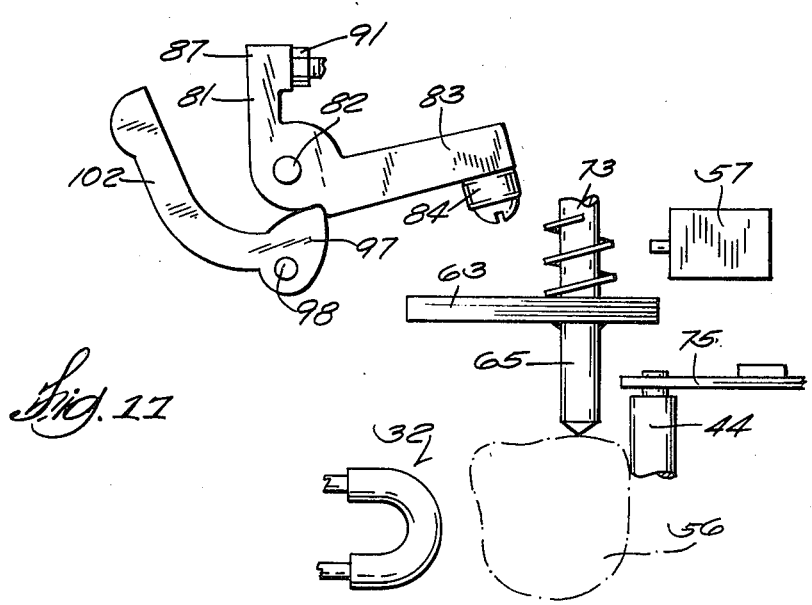

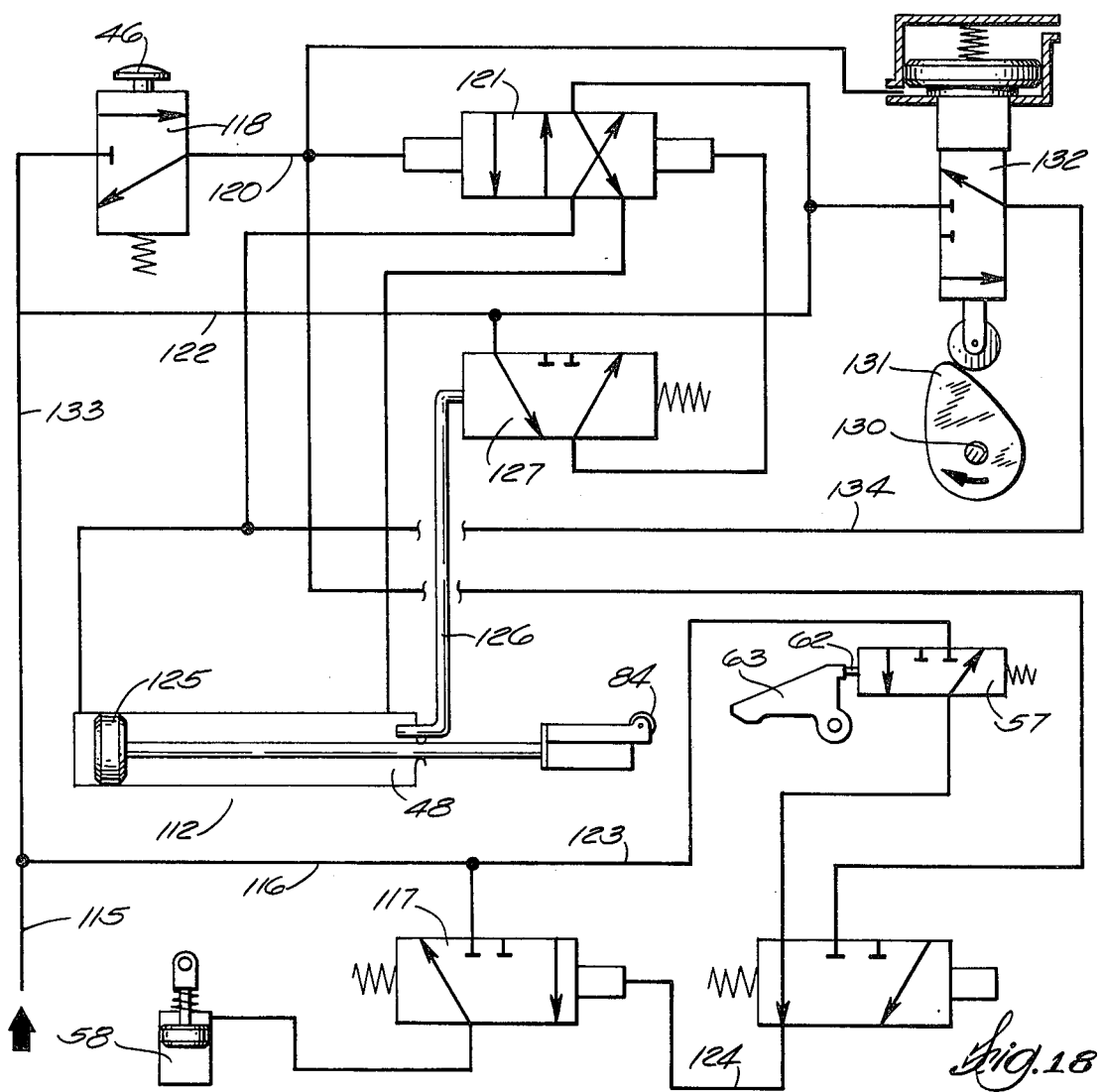
Fig. 18
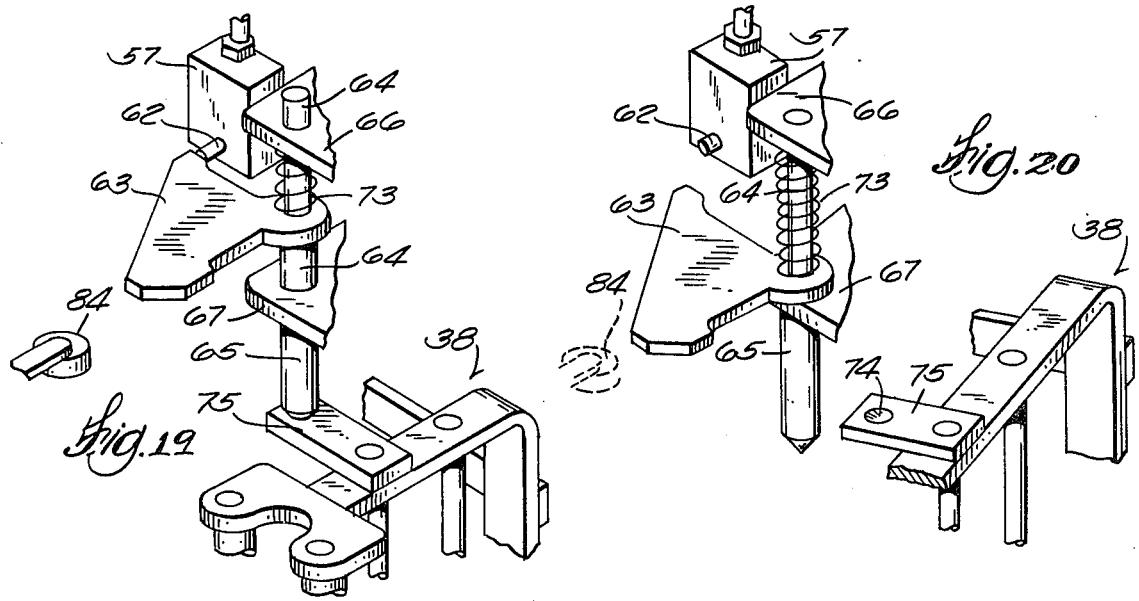
Fig. 19
Fig. 20

3,987,881

SAFETY GUARD

BACKGROUND OF THE INVENTION

It is known to provide safety gates for punch presses. Prior art suggestions in this regard are exemplified in the United States patents to Jones U.S. Pat. No. 1,575,843, Booth U.S. Pat. No. 2,315,151 and Hess U.S. Pat. No. 3,300,009.

SUMMARY OF THE INVENTION

This invention relates to improvements in machine tool safety or barrier gates and in particularly related to gate-actuated mechanism by which the machine tool control member is actuated. In accordance with the present invention, a single gate-actuated control member is used to control the operation of the machine tool. The control member responds both to movement of the sliding gate and to movement of the swinging gate. On closure of the sliding gate, if the swinging gate remains closed, the control actuator is latched out to an inoperative position, thus to prevent repeated actuation of the control in the event the gate does not return to its full open position prior to reclosure. On return of the sliding gate to full open position, the latch is released to restore the control actuator to actuating position and conditions the mechanism for actuation of the machine tool control member on the next closing cycle of the sliding gate.

Moreover, the same control member is subject to disablement in the event the operator's hand is pushed by the sliding gate against a bumper on the swinging gate. This prevents operation of the machine tool until the swinging gate is closed and the disabling mechanism reset.

Other objects, features and advantages of the invention will appear from the disclosure hereof.

DESCRIPTION OF THE DRAWINGS

FIG. 8 is an enlarged fragmentary plan view of parts of the apparatus shown in FIG. 5.

FIG. 9 is a fragmentary elevation of the parts shown in FIG. 8.

FIG. 12 is a fragmentary diagrammatic side elevation illustrating the relationship between the various components of the control actuating mechanism when the sliding gate is fully open.

FIG. 13 is a view similar to FIG. 12, but showing the engagement of the control actuator on the sliding gate with the control operating lever.

FIG. 14 is a view similar to FIGS. 12 and 13, but showing the control actuator pivoted to its inoperative position after having actuated the control.

FIG. 15 is a fragmentary diagrammatic side elevation illustrating the operative parts of the control actuating mechanism and illustrating how the control disabling mechanism on the swinging gate normally holds the control operating lever in an operative position.

FIG. 16 is a view similar to FIG. 15, but showing how the control operating lever disabling means functions when the swinging gate has been pivoted away under pressure of the sliding gate pushing the operator's hand against the swinging gate's bumper.

FIG. 17 is a view similar to FIGS. 15 and 16, but showing that when the sliding gate reaches the end of its travel to its normally closed position and with the swinging gate swung to a position in which the disabling means has been actuated, the control actuator on the sliding gate is out of range of contact with the control operating lever.

FIG. 18 is a schematic pneumatic control circuit.

FIG. 19 is a fragmentary diagrammatic perspective view of the control operating lever in normal position.

FIG. 20 is a view similar to FIG. 19 in which the swinging gate has swung to actuate the control operating lever disabling mechanism.

DESCRIPTION OF THE PREFERRED EMBODIMENT

Figure 1:
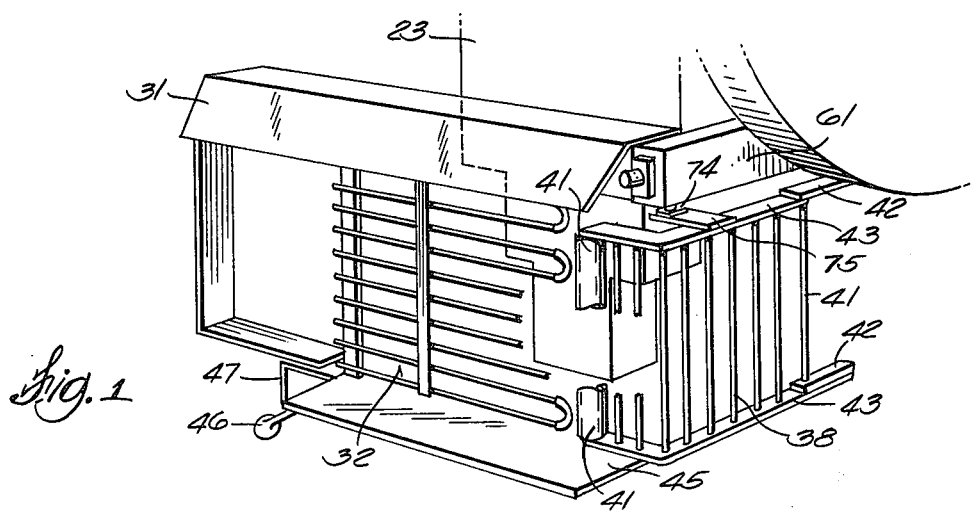
FIG. 1 is a fragmentary perspective view illustrating a portion of a machine tool such as a punch press equipped with a safety guard embodying the present invention.

Although the disclosure hereof is detailed and exact to enable those skilled in the art to practice the invention, the physical embodiments herein disclosed merely exemplify the invention which may be embodied in oher specific structure. The scope of the invention is defined in the claims appended hereto.

FIGS. 1–4 illustrate fragmentarily a machine tool such as a punch press 20 which has a bed 21 with a die set 22 mounted hereon. The ram 23 of the punch press advances a tool 24 towad workpiece 25.

In order to guard against operator access to the danger zone in the vicinity of the operating ram 23, several gates are disposed about the operating ram 23. There is a stationary wire bar gate 26 which is mounted on a stationary frame 27, at one side of the ram 23. Pivotally mounted to the frame 27 on the pintle 28 (FIG. 4) is a swinging frame 31 on which a sliding wire bar gate 32 is mounted. Gate 32 is suspended from a trolley 23 supported from an overhead way or track 34 on trolley carriages 35. The respective carriages have paired guide wheels 36 which bear on the sides of the track 34 and paired wheels 37 which bear on the top and bottom of the track 34, thus to guide the sliding gate 32 therealong. Trolley 33 is powered by the pneumatic motor cylinder 48, as hereinafter explained.

Figure 3:
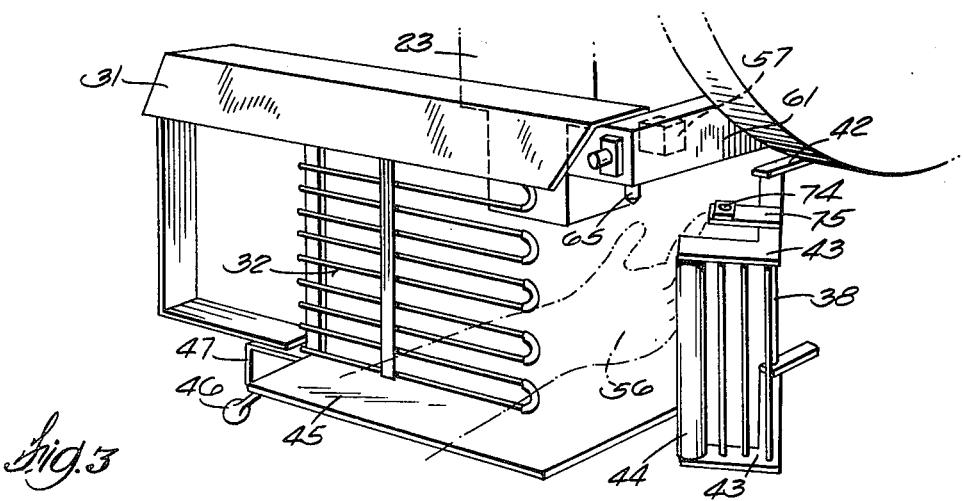
FIG. 3 is a perspective view similar to FIGS. 1 and 2, but illustrating the situation where the operator has not removed his hand from the gap and it has been pushed by the closing action of the sliding gate against the bumper on the swinging gate, thus to disable actuation of the machine tool control member.
Figure 4:
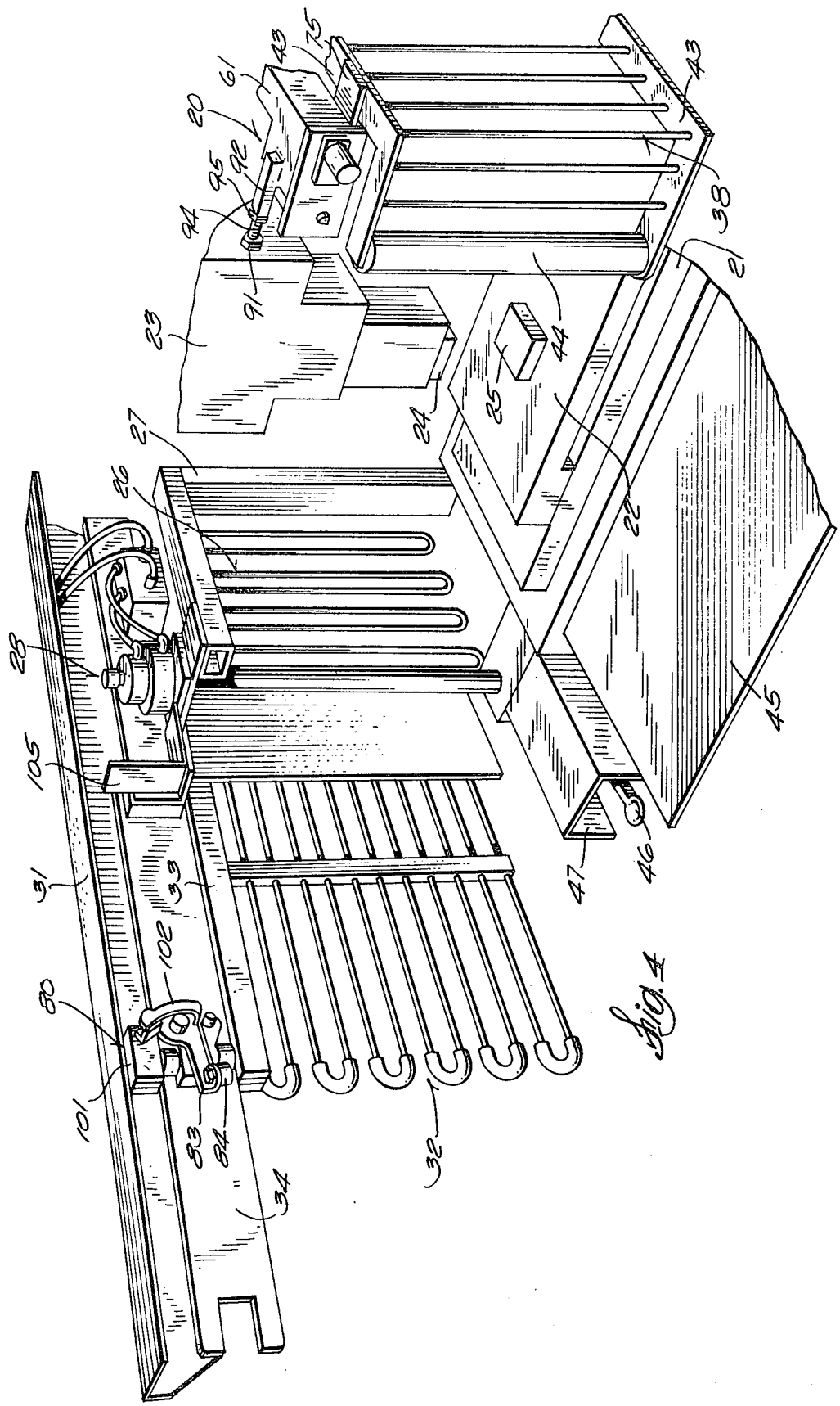
FIG. 4 is a perspective view showing the sliding gate and its supporting framework pivoted to an inoperative service position. This figure illustrates various parts of the apparatus which would otherwise be concealed in FIGS. 1–3.
Figure 5:
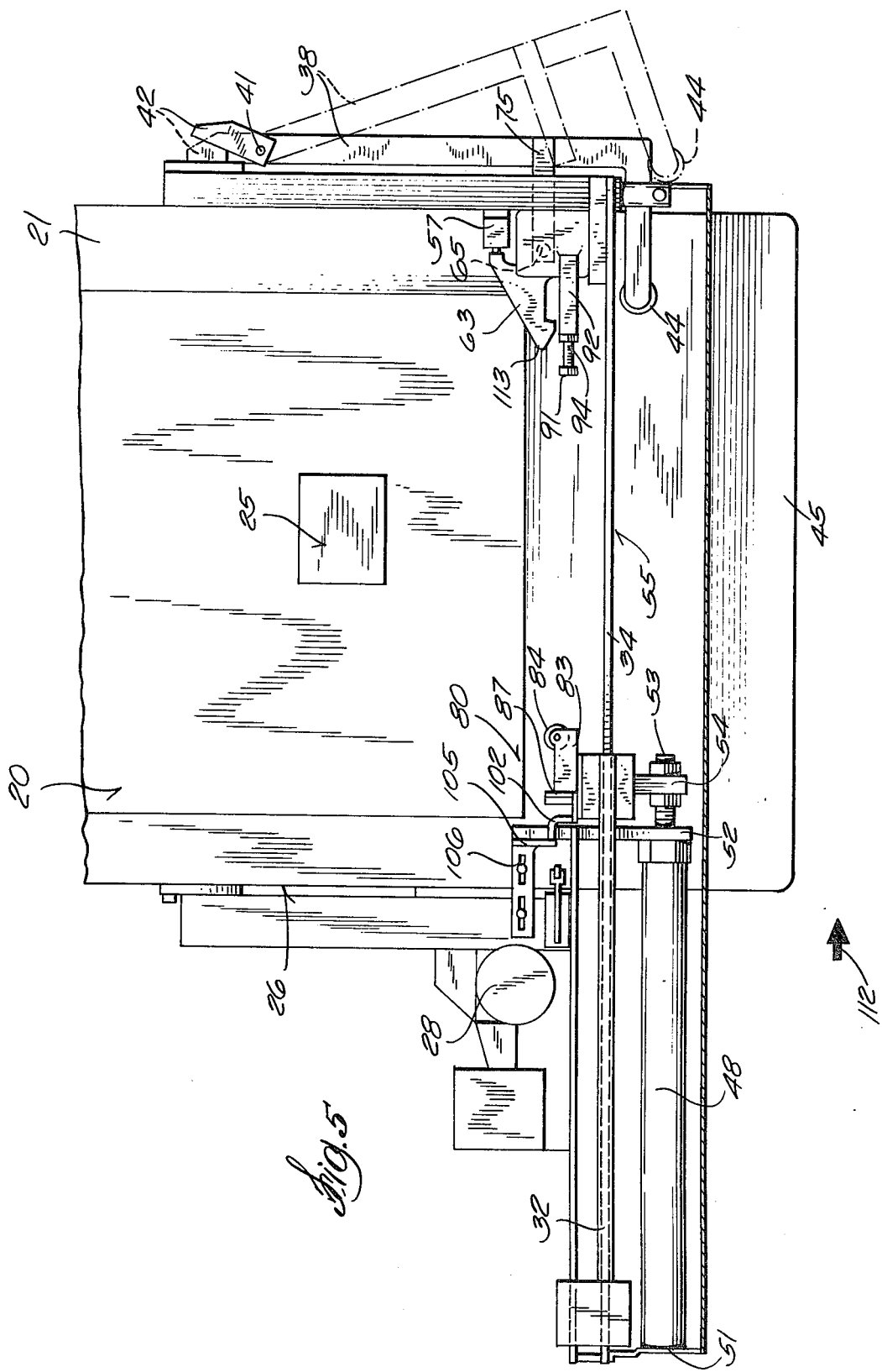
FIG. 5 is a plan view of a safety guard embodying the invention.

At the side of the machine tool opposite fixed gate 26 is disposed a swinging gate 38. Gate 38 also comprises a wire bar shield and is mounted by pintle 41 on brackets 42. Gate 38 has top and bottom rails 43 which are L-shaped so that while the main portion of the gate is at the side of the machine tool, a short front section carrying a rubber bumper 44 is at the front of the tool and is disposed in the path of travel of the sliding gate 32. As best illustrated in FIGS. 3, 5 and 8, swinging gate 38 can swing between the various positions shown in these figures.

A workpiece loading apron 45 extends ahead of the machine tool bed 21 to facilitate feeding and discharging workpieces with respect to the machine. At one side of apron 45 is an actuating lever 46 shielded by a cover 47. Lever 46 is incorporated in the pneumatic circuit of FIG. 18 to the pneumatic motor 48 by which the gate 32 is powered. As best shown in FIGS. 5 and 8, pneumatic motor 48 has its rear end mounted on a bracket 51 mounted on track 34 and its forward end mounted on bracket 52, which is also mounted on the track 34. Piston rod 53 is connected by bracket 54 to the gate carriage 35. Accordingly, actuation of the lever 46 in the pneumatic circuit shown in FIG. 18 will close the gate 32.

Figure 2:
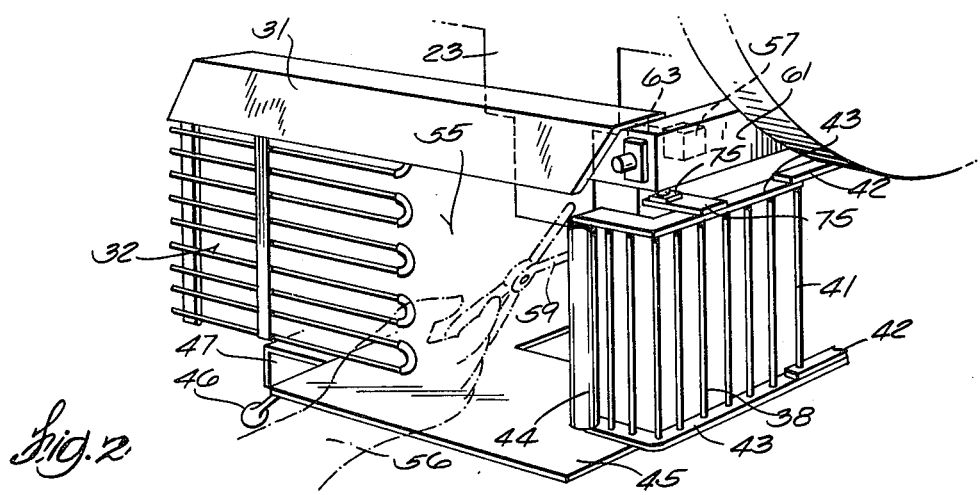
FIG. 2 is a perspective view similar to FIG. 1 in which the sliding gate is fully retracted and the machine tool operator has access to the working zone of the tool through the gap between the sliding gate and the swinging gate.

When the gate 32 is open, there is a gap 55 between the gate 32 and the rubber bumper 44 on swinging gate 38, thus to provide access by the machine tool operator to the vicinity of the workpiece 25 beneath ram 23 of the machine tool. FIG. 2 illustrates the operator's hand 56 inserted through the gap 55 and utilizing tongs 59 or the like to manipulate the workpiece 25.

Figure 10:
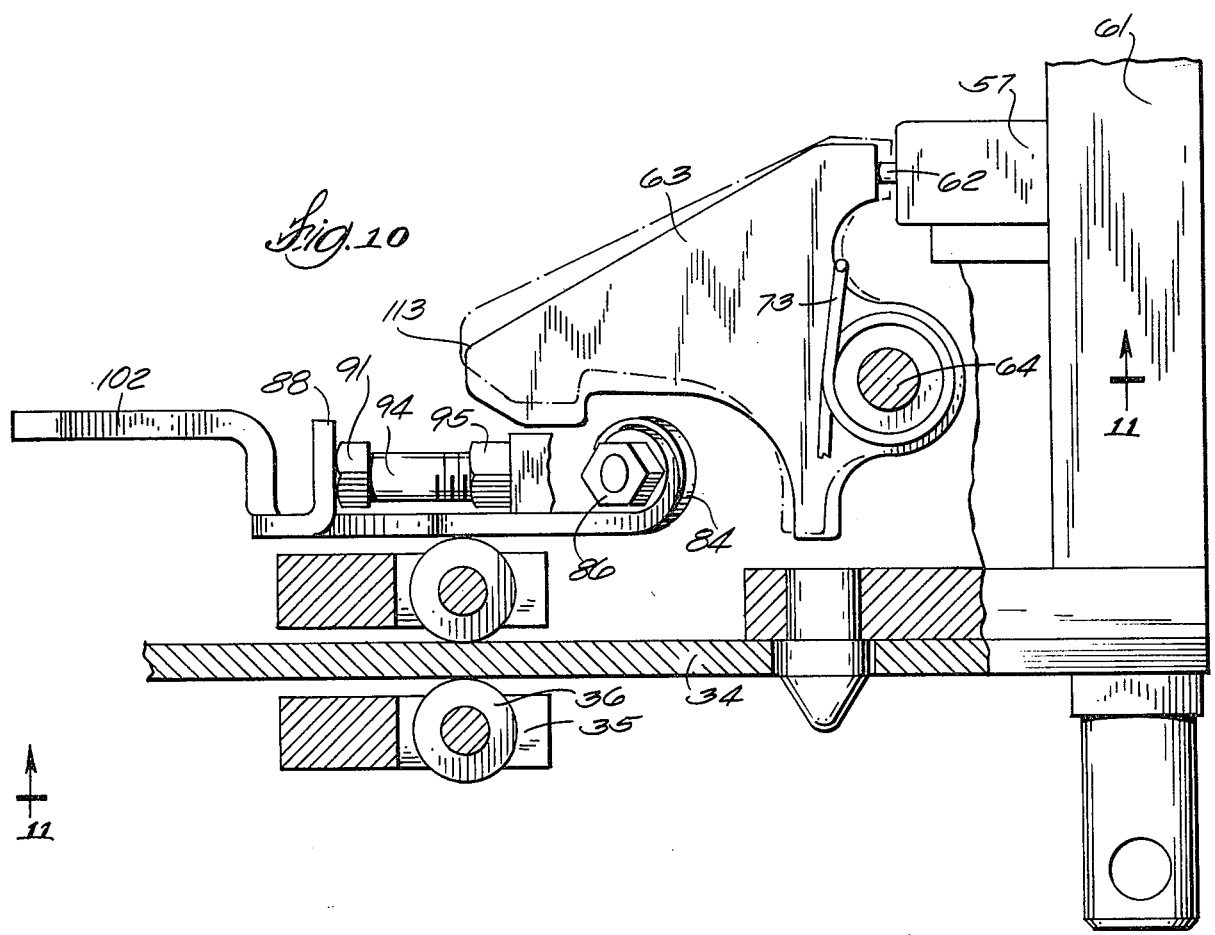
FIG. 10 is an enlarged fragmentary horizontal cross section illustrating the relationship between the machine tool control member, its operating lever and the lever actuator on the sliding gate.
Figure 11:
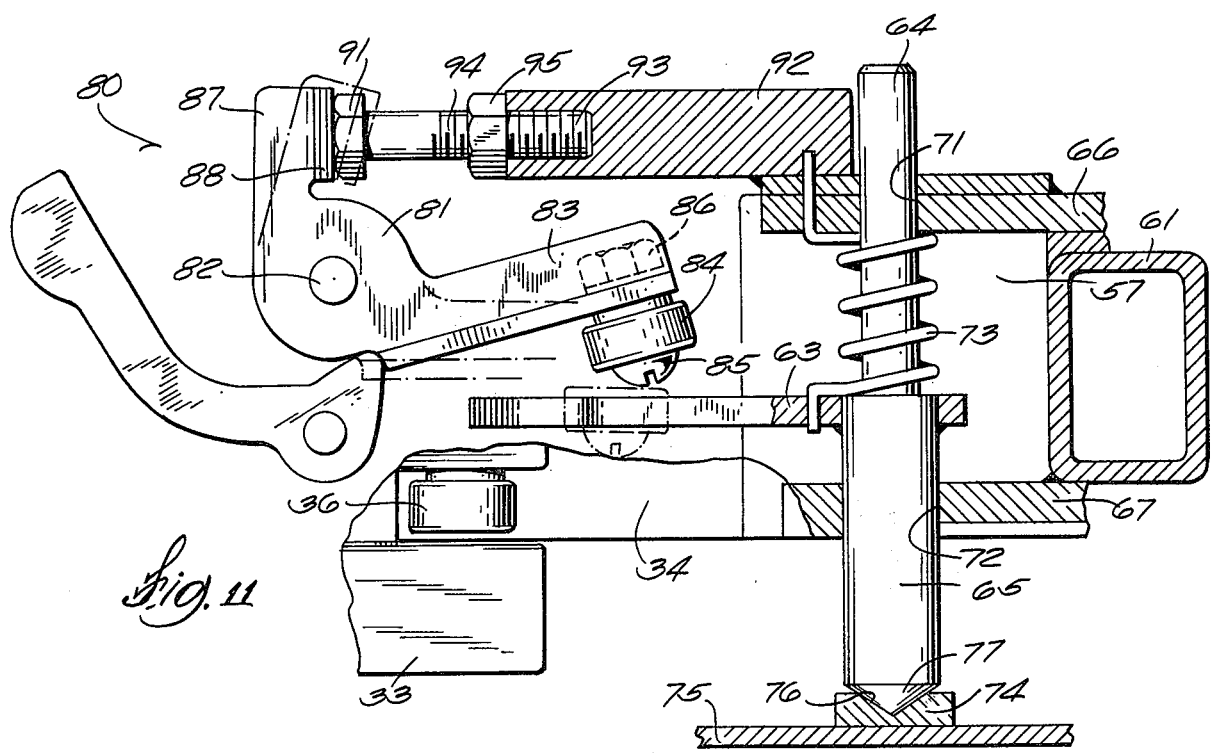
FIG. 11 is a vertical cross section taken along the line 11—11 of FIG. 10.

As shown in the schematic diagram of FIG. 18, the trip cylinder 58 for the machine tool is energized by a control member such as valve 57 which is stationarily mounted on frame 61 (FIGS. 10 and 11). Actuation of the plunger button 62 of control valve 57 is a prerequisite to energization of the trip cylinder 58 and operation of the punch press. FIGS. 10 and 11 show in detail the plunger operating mechanism, including a plunger button operating lever 63 which is pivotally mounted on vertically oriented pintle 64 which has an enlarged axially aligned extension 65 at its lower end. Frame brackets 66, 67 (FIG. 11) are provided with axially aligned holes 71, 72 through which the pintle 64 and extension 65 can move axially under pressure of gravity and the coil spring 73 which biases the pintle 64 and its extension 65 downwardly against pad 74 on bracket 75 mounted on the top rail 43 of the swinging gate 38. Pad 74 has a conical socket 76 and the lower end of pintle extension 65 has a conical foot 77 so that on swinging motion of the swinging gate 38 from its position shown in FIG. 2 to its position shown in FIG. 3, the pad 74 will be withdrawn from beneath the pintle extension 65. The pintle, together with the control operating lever 63 will then move downwardly under the influence of gravity and spring 73 from its position shown in FIGS. 2, 15 and 19 to its position shown in FIGS. 3, 16 and 20, thus disabling actuation of control member 57 by moving the operating lever 63 to a position out of range of the control plunger button 62.

Two power circuits are utilized. The first power circuit is the usual circuit for actuating the operating ram part 23 of the punch press or machine tool. This power circuit is illustrated schematically in FIG. 18. It includes the pneumatically energized trip cylinder 58. Pressurized air is supplied by air source 115 through air line 116 to valve 117. Valve 117 is controlled by control valve 57 which is closed only when the safety gates 32 and 38 are both closed.

A second power circuit for operating the air cyclinder 48 for safety sliding gate 32 is also shown in FIG. 18. This circuit includes a pneumatic valve 118 actuated by the trip lever 46 which is adjacent the feed apron 45.

Trolley 33 for sliding gate 32 carries control actuator mechanism indicated generally by reference character 80. This actuator mechanism is best shown in FIGS. 4, 6, 7 and 11 and comprises a bell crank 81 pivotally mounted by pin 82 to a carrier bracket 101 mounted on trolley 33. Bell crank 81 has a generally horizontally extending arm 83 which carries a roller 84 by which the operating lever 63 for control valve 57 is actuated. Roller 84 is mounted on a generally vertical pivot formed by the bolt 85 secured to the arm 83 by the nut 86.

Bell crank 81 is further provided with a generally upright arm 87 which carries a pad 88 aligned in the path of movement of the sliding gate 32 with an actuating stop 91 which is adjustably fixed on bracket 92 on frame 61. As best shown in FIG. 11, bracket 92 has a tapped socket 93 and the stop 91 comprises the head on a threaded bolt 94 which is threaded into the socket 93 and adjustably locked into position by the lock nut 95.

Figure 6:
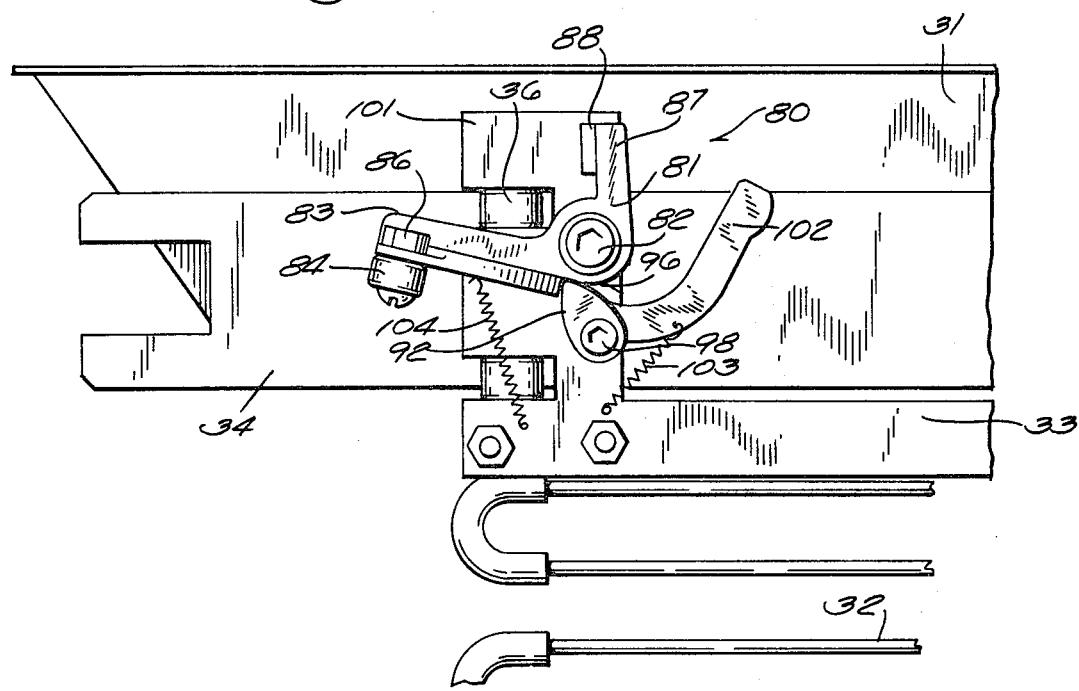
FIG. 6 is an enlarged fragmentary detailed view of the inside of the sliding gate showing the control actuator with its latch set to hold the actuator in inoperative position.
Figure 7:
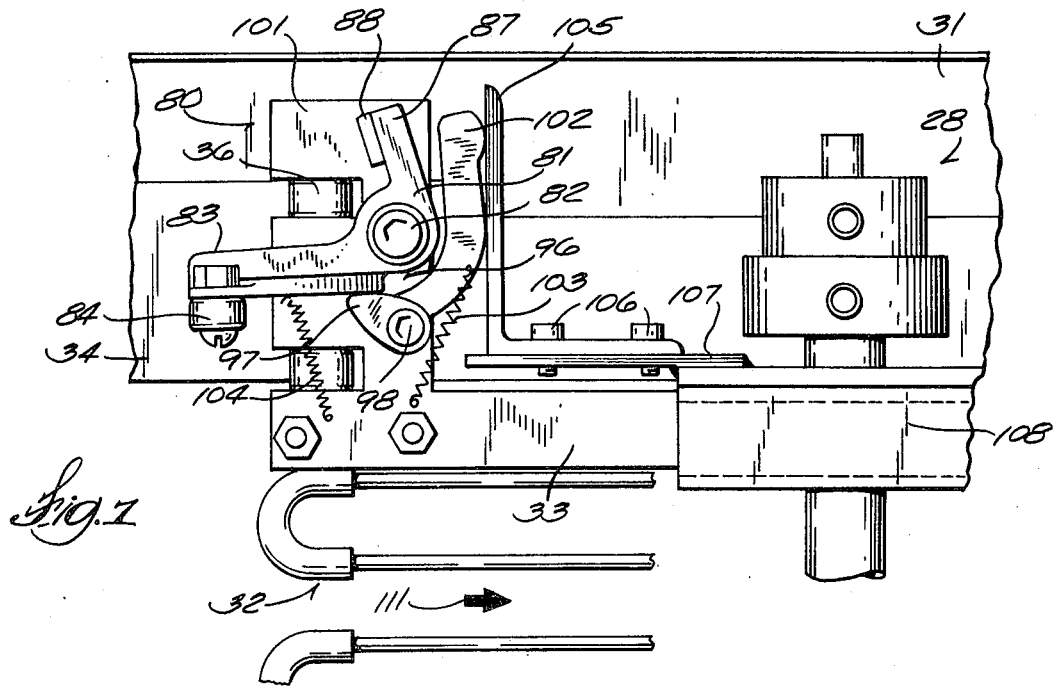
FIG. 7 is a fragmentary view similar to FIG. 6, but showing the sliding gate fully retracted in its open position and with the latch unlatched to restore the control actuator to operative position.

The undersurface of horizontal arm 83 of bell crank 81 is provided with a latch receiving notch 96 (FIGS. 6 and 7). Notch 96 may receive the free end of latch 97 which is pivotally mounted on carrier bracket 101 by pin 98. Latch 97 has affixed thereto a curved trigger arm 102. Arm 102 is biased by spring 103 and by gravity to rotate latch 97 clockwise as shown in FIGS. 6 and 7. Arm 83 of bell crank 81 is biased by gravity and by spring 104 to rotate counterclockwise as shown in FIGS. 6 and 7.

FIGS. 12–17, inclusive, illustrate diagrammatically the various positions of important parts of the control apparatus during successive steps in the cycle of operation. FIG. 12 illustrates the sliding gate 32 in its open position spaced by gap 55 from bumper roller 44 on the end of swinging gate 38. When the gate 32 is fully opened to its position shown in FIGS. 5, 7 and 12, the latch trigger 102 will have been forcibly engaged with the stationary bracket stop 105 which is mounted by bolts 106 on the fixed bracket 107 mounted on a stationary part 108 of the frame. Pressure of the retracting movement of the gate 32 in the direction of arrow 111 in FIG. 7 will contact the trigger 102 against the bracket 105 and pivot the latch 97 about pin 98 against the bias of spring 103 and hence withdraw the latch 97 from the latch notch 96 in bell crank 81. Spring 104 and the force of gravity will pull arm 83 to its horizontal position illustrated in FIGS. 7 and 12.

As shown in FIG. 12, the roller 84 on horizontal bell crank arm 83 is now aligned with the control operating lever 63 which is mounted on the pin 65.

After the machine tool operator has properly positioned the workpiece 25, for example, by using the tongs 59 and working through the gap 55 as shown in FIG. 2, he will withdraw his hand 56 from the gap 55 and will initiate closure of the gate 32 and subsequent actuation of the machine tool ram (via trip cylinder 58) by depressing the valve lever 46 at the side of the machine. As illustrated in the pneumatic circuit of FIG. 18, this will then actuate reversing air control valve 121 through air line 120 and pressurize one side of air cylinder 48 from air line 122 and cause movement of the gate 32 in the direction of arrow 112 in FIGS. 5 and 12 and 18. Assuming that the operator's hand 56 is actually withdrawn from gap 55, the gate 32 will close to its position shown in FIGS. 1 and 13 at which point the roller 84 on bell crank 81 will engage the beveled head 113 (FIG. 10) of the operating lever 63 and swing it against the bias of spring 73 from its full line position to its broken line position shown in FIG. 10, thus to depress plunger 62 of control valve 57. This completes the air circuit from air lines 116, 123, valve 57 and air line 124 to air valve 117 for trip cylinder 58, thus to actuate ram 23.

From the foregoing it is clear that the punch press control 57 is not actuated until the gate 32 is closed. After gate 32 is closed, it blocks access to the vicinity of the ram and it is now safe to operate the press. In the event the operator actuates control lever 46 before he withdraws his hand 56 from gap 55, or some other object intervenes between the gates 32, 38, the resistance offered by the intervening object 56 may stop the closing motion of gate 32, so that the control actuator roller 84 never reaches the control operating lever 63. Alternatively, if the intervening object 56 does not offer sufficient resistance to stop movement of the gate 32, gate 32 will continue to move but will push the object 56 against the bumper 44 and swing gate 38 to its full line position shown in FIGS. 3 and 20 and its broken line position shown in FIGS. 5 and 8 and thus disable actuation of control valve 57, as hereinafter described. Accordingly, when either gate 32 or 38 is open, the ram 23 will not operate.

Assuming actuation of control 57 in normal course, further closing movement of the gate 32 beyond its almost closed position shown in FIG. 13 will bring the parts to their position shown in FIG. 14 in which the adjustably fixed stop 91 is engaged by the pad 88 on the upright arm 87 of bell crank 81, thus to pivot the bell crank 81 counterclockwise in FIG. 14 and clockwise as shown in FIG. 6 and lift the generally horizontal arm 83 and its roller 84 above the level of the control operating lever 63 and to the position of the parts shown in FIGS. 6, 10, 11 and 14. Thus the roller 84 is shifted out of range of lever 63. This shifting movement also permits spring 103 to pivot the latch arm 102 clockwise as shown in FIG. 6 and swing the latch 97 into the latch notch 96 at the undersurface of bell crank arm 83, thus to hold bell crank arm 83 and roller 84 in its inoperative latch position illustrated in FIGS. 6, 10, 11 and 14. The purpose of latching the roller 84 in its inoperative position is to prevent subsequent and repeated operation of the control valve 57 and to require that sliding gate 32 be fully retracted to its open position of FIGS. 5, 7 and 12 before control 57 can again be actuated.

In the fully closed position of gate 32, the piston 125 of air cylinder 48 will engage push rod 126 which is connected to air valve 127 (FIG. 18). Air line 122 is thus fed to the reversing valve 121 to reverse its position and supply air to the right side of piston 125 as shown in FIG. 18. Gate 32 will then retract to its open position as shown in FIGS. 2, 5, 7, 8 and 12 and the latch arm 102 will contact the fixed bracket 105 when the gate is fully retracted to unlatch the latch 97 and restore the actuating mechanism to its operative position as shown in FIG. 7.

Control 57 is disabled so as to prevent operation of the ram 23 when the swinging gate 38 is swung to its position shown in FIG. 3 by the novel apparatus of the present invention. Bracket 75 which carries the socket 74 for pin 65 is swung out from underneath the pin 65 as shown in FIGS. 3, 5, 8, 16 and 20, when gate 38 swings open. Accordingly, the downward bias of spring 73 will force the pin 65 downwardly, thus carrying with it the control operating lever 63 and lowering it below the plane in which it can engage plunger 62 of control valve 57 and also lowering it below the path of movement of the gate roller 84. The sequence is illustrated in FIGS. 16 and 17. FIG. 15 shows the parts before gate 38 is swung to open position. Roller 84 aligns with control operating lever 63. FIG. 16 shows the position of the parts when the gate 32 engages the operator's hand 56 and pushes it against bumper 44. Pin 65 and control operating lever 63 has dropped below the path of advance of roller 84. FIG. 17 shows that when the gate 32 reaches its nearly closed position (comparable to its position shown in FIG. 13), roller 84 will not control lever 63 and control 57 will not be operated. Further forward movement of the gate 32 will latch bell crank 82 in its inoperative position, as hereinbefore described, thus requiring complete opening of the gate 32 to unlatch the bell crank.

To reset the lever 63 to operative position, the machine tool operator must lift the pin 63 against the bias of spring 73 and swing gate 38 back to its position shown in FIG. 2 and reposition the socket 74 underneath the pin 65. Air cylinder 48 will have restored the gate 32 to its FIG. 2 position, as hereinbefore described and bell crank 81 has been unlatched and restored to operative position.

FIG. 18 also illustrates another safety feature. Crankshaft 130 of the press carries a cam 131 which controls air valve 132 in air line 133 from air source 115. Air valve 132 can connect air line 133 to air line 134 which is also connected to the left side of piston 125 in air cylinder 48 as shown in FIG. 18. Cam 131 is so adjusted so that if ram 23 inadvertently descends without having been actuated by trip cylinder 58 in normal operation, air line 134 will be pressurized to cause air cylinder 48 to close gate 32 and sweep any object out of the danger area beneath ram 23 before the ram reaches the bottom of its stroke. This apparatus constitutes an auxiliary safety mechanism effective during a malfunction of the ram power apparatus to actuate the sliding gate independently of any operator actuation of control lever 46.

What is claimed is:

1. A safety guard for a machine tool having an operating part controlled by a control member, said guard comprising gates between said operating part and a machine tool operator, one of said gates having a way on which said one gate is slidable across the front of the machine tool, another of said gates being disposed at the side of the machine tool and having pivot means at one end on which said other gate is swingable, the other end of the swingable gate being disposed in the path of sliding movement of the sliding gate and being free to swing, whereby sliding movement of the sliding gate toward the swinging gate will push an intervening object against the free end of the swinging gate to thereby swing the swinging gate on its pivot means, said sliding gate having control member actuating means for normally actuating said control member at the end of its travel toward the swinging gate, thus to actuate the operating part of the machine tool; and control member disabling means responsive to swinging movement of the swinging gate to prevent operation of said operating part of the machine tool when such an intervening object is pushed by the sliding gate against the swinging gate.

2. The safety guard of claim 1 in which said control member has an operating lever in the path of movement of the control member actuating means on the sliding gate, said control member disabling means comprising a retractable support for said operating lever, and means responsive to swinging motion of the swinging gate to retract the operating lever out of the path of the control member actuating means on the sliding gate.

3. The safety guard of claim 2 in which the disabling means further comprises an axially movable pintle on which the operating lever is swingably mounted, a pad mounted on the swinging gate and normally disposed beneath the pintle, means biasing said pintle axially against said pad whereby retraction of said pad as a consequence of swinging motion of the swinging gate will result in axial movement of said pintle and lever.

4. The safety guard of claim 1 in which said control member actuating means on the sliding gate is provided with latch means for latching it in a position out of the path of actuation of said control member, and means responsive to completion of the travel of the sliding gate to actuate said latch to prevent repeated control member actuation.

5. The safety guard of claim 4 in combination with means responsive to return of said sliding gate to an open position remote from said swinging gate to unlatch said latch and return the control member actuating means to operative position.

6. A safety guard for a machine tool having an operating part controlled by a control member, said guard comprising a gate between said operating part and a machine tool operator, power-operated means for opening and closing said gate, support means for supporting said control member adjacent the closed position of the gate, control member actuating means carried by the gate for actuating the control member in the course of its movement to closed position, latching means responsive to closure of the gate to latch said control member actuating means against repeated actuation of the control member and unlatching means responsive to opening of the gate to unlatch said latch.

7. The safety guard of claim 6 in which said control member actuating means carried by the gate comprises a bell crank having control member actuating arm, said latching means comprising a latch, a latch arm, a latch seat on the bell crank, said latch being receivable in said latch seat and abutment means adjacent said control member and in the path of movement of the bell crank to pivot the bell crank into inoperative position out of range of the control member and engage the latch in its seat to hold the control member actuating means in inoperative position.

8. The safety guard of claim 7 in which said unlatching means comprises abutment means engaged by said latch arm when the gate is opened, thus to remove the latch from its seat and restore the bell crank control member actuating arm to its operative position.

9. A safety guard for a machine tool having an operating part controlled by a control member, said guard comprising a gate between said operating part and a machine tool operator, power-operated mean for opening and closing said gate, support means for supporting said control member adjacent the closed position of the gate, control member actuating means carried by the gate for actuating the control member in the course of its movement to closed position whereby to initiate operation of the operating part, a bumper toward which the gate moves and against which the gate will push an intervening object and control member disabling means responsive to pressure of such object against the bumper to prevent actuation of said control member and thereby prevent initiation of the operation of said operating part of the machine tool when such object is pushed by the gate against the bumper.

10. A safety guard for a machine tool having an operating part controlled by a control member, said guard comprising a gate between said operating part and a machine tool operator, power-operated means for opening and closing said gate, support means for supportng said control member adjacent the closed position of the gate, control member actuating means carried by the gate for actuating the control member in the course of its movement to closed position, a bumper toward which the gate moves and against which the gate will push an intervening object and control member disabling means responsive to pressure of such object against the bumper to prevent operation of said operating part of the machine tool when such object is pushed by the gate against the bumper, said control member having an operating lever in the path of movement of the control member actuating means on the gate, said control member disabling means comprising a retractable support for said operating lever, and means responsive to pressure on the bumper to retract the operating lever out of the path of the control member actuating means on the gate.

11. The safety guard of claim 10 in which the disabling means further comprises an axially movable pintle on which the operating lever is swingably mounted, a second movable gate to which said bumper is attached, a pad mounted on the second gate and normally disposed beneath the pintle, means biasing said pintle axially against said pad whereby retraction of said pad as a consequence of motion of the second gate will result in axial movement of said pintle and lever.

12. In a punch press having a power-operated reciprocating ram, a safety gate and gate power means to move the gate in front of the ram, ram control means in the path of said gate whereby the power means for the ram will normally not be actuated until the gate closes, and auxiliary means for actuating the gate power means in the event of a malfunction in which the ram advances before the gate closes to actuate the ram control means, thus to close the gate in response to such ram advance.

13. The apparatus of claim 12 in which the punch press has a crankshaft which turns during ram advance, said auxiliary means comprising a cam turned by the crankshaft and a control for the gate power means responsive to cam movement whereby the gate power means is energized when the ram advances.

* * * * *